(12) United States Patent
Hong (10) Patent No.: US 11,318,655 B2
(45) Date of Patent: May 3, 2022

(54) METHOD FOR MANUFACTURING DUAL COSMETIC CONTAINER

(71) Applicant: JUNG MIN CO., LTD., Gyeonggi-do (KR)

(72) Inventor: Jung Min Hong, Seoul (KR)

(73) Assignee: JUNG MIN CO., LTD., Gyeonggi-Do (KR)

( * ) Notice: Subject to any disclaimer, the term of this patent is extended or adjusted under 35 U.S.C. 154(b) by 323 days.

(21) Appl. No.: 16/465,378

(22) PCT Filed: Oct. 2, 2018

(86) PCT No.: PCT/KR2018/011701
§ 371 (c)(1),
(2) Date: May 30, 2019

(87) PCT Pub. No.: WO2019/107725
PCT Pub. Date: Jun. 6, 2019

(65) Prior Publication Data
US 2019/0291331 A1    Sep. 26, 2019

(30) Foreign Application Priority Data

Nov. 28, 2017  (KR) .......................... 10-2017-0160869

(51) Int. Cl.
*B29C 49/00* (2006.01)
*B29B 11/14* (2006.01)
(Continued)

(52) U.S. Cl.
CPC .......... *B29C 49/0073* (2013.01); *B29B 11/14* (2013.01); *B29C 45/14688* (2013.01);
(Continued)

(58) Field of Classification Search
CPC ................ B29C 49/0078; B29C 49/52; B29C 2049/228; B29C 45/1684; B29C 45/1679;
(Continued)

(56) References Cited

U.S. PATENT DOCUMENTS 3,964,910 A     6/1976 Geist
4,233,262 A *  11/1980 Curto .................. B29C 49/0073
                                                                264/509
(Continued)

FOREIGN PATENT DOCUMENTS

CN         1922077        2/2007
JP         S52-152460    12/1977
(Continued)

OTHER PUBLICATIONS

Translation of KR 20160100034 A, Aug. 23, 2016 (Year: 2016).*
Translation of KR 101341643 B1, Jan. 2, 2014 (Year: 2014).*

*Primary Examiner* — Benjamin A Schiffman
(74) *Attorney, Agent, or Firm* — Duane Morris LLP; Gregory M. Lefkowitz (57) ABSTRACT

Discloses is a method for manufacturing a dual cosmetic container. The method includes: molding an inner preform 40 or 40a formed with a patterned portion having one or more shapes selected from characters, pictures, figures, and helical grooves on the outer surface thereof using an upper mold 10 for the inner preform having a molding space 11 and formed with a pattern molding portion 12a on the inner circumferential surface thereof and an lower mold 14 for the inner preform having a molding space 15 for a discharge portion; inserting the inner preform 40 or 40a into a molding space 21 of an upper mold 20 for an outer preform, fixing a discharge portion 41 of the inner preform 40 or 40a to a lower mold 23 for the outer preform, feeding a liquid raw material into the molding space 21 of the upper mold 20 for the outer preform, and molding the outer preform 50 in close (Continued)

contact with the outer surface of the inner preform 40 or 40a formed with the patterned portion 42; and simultaneously heating the inner preform 40 or 40a and the outer preform 50 molded in close contact with each other, inserting the two heated preforms into a molding space 31 of a blow mold 30, inserting a blow tube 32 into the discharge portion 41 of the inner preform 40 or 40a, and simultaneously expanding the inner preform 40 or 40a and the outer preform 50 by blow molding to manufacture the desired dual cosmetic container in which an inner container 100 or 100a and an outer container 200 are in close contact with each other.

5 Claims, 9 Drawing Sheets

(51) Int. Cl.
| | |
|---|---|
| *B29C 49/48* | (2006.01) |
| *B29C 49/02* | (2006.01) |
| *B29C 49/22* | (2006.01) |
| *B29C 49/42* | (2006.01) |
| *B29C 45/14* | (2006.01) |
| *B29C 45/16* | (2006.01) |
| *B29C 45/37* | (2006.01) |
| *A45D 40/00* | (2006.01) |
| *B29L 31/00* | (2006.01) |
| *A45D 40/24* | (2006.01) |
| *A45D 34/00* | (2006.01) |

(52) U.S. Cl.
CPC ........ B29C 45/1625 (2013.01); B29C 45/374 (2013.01); B29C 49/02 (2013.01); B29C 49/22 (2013.01); B29C 49/221 (2013.01); B29C 49/4252 (2013.01); B29C 49/48 (2013.01); *A45D 40/00* (2013.01); *A45D 40/24* (2013.01); *A45D 2034/007* (2013.01); *A45D 2040/0006* (2013.01); *A45D 2040/0012* (2013.01); *A45D 2200/053* (2013.01); *B29B 2911/14046* (2013.01); *B29B 2911/1448* (2013.01); *B29B 2911/14133* (2013.01); *B29B 2911/14213* (2013.01); *B29B 2911/14344* (2015.05); *B29C 45/14598* (2013.01); *B29K 2995/002* (2013.01); *B29K 2995/0026* (2013.01); *B29K 2995/0029* (2013.01); *B29L 2031/712* (2013.01); *B29L 2031/718* (2013.01); *B29L 2031/7158* (2013.01); *B29L 2031/722* (2013.01)

(58) Field of Classification Search
CPC .... B29C 45/14688; B29C 2045/14696; B29C 59/021; B29C 59/02; B29B 11/08
See application file for complete search history.

(56) References Cited

U.S. PATENT DOCUMENTS

| | | | |
|---|---|---|---|
| 4,289,817 A | | 9/1981 | Valyi |
| 4,307,137 A | | 12/1981 | Ota |
| 4,320,083 A | * | 3/1982 | Jakobsen ............. B65D 1/0223 |
| | | | 264/531 |
| 4,391,861 A | * | 7/1983 | Nilsson ................ B29C 31/002 |
| | | | 428/35.7 |
| 5,101,990 A | * | 4/1992 | Krishnakumar .... B29C 49/0078 |
| | | | 215/383 |
| 2005/0170113 A1 | | 8/2005 | Hill |
| 2005/0191451 A1 | | 9/2005 | Osika |

FOREIGN PATENT DOCUMENTS

| | | |
|---|---|---|
| JP | S55-142623 | 11/1980 |
| JP | H05-053921 | 7/1993 |
| JP | 07-0002031 | 6/1995 |
| JP | 2004-175434 | 6/2004 |
| KR | 1012887970000 | 7/2013 |
| KR | 1013416430000 | 12/2013 |
| KR | 1020160100034 | 8/2016 |
| KR | 1020160100040 | 8/2016 |
| KR | 1019003820000 | 9/2018 |

* cited by examiner

METHOD FOR MANUFACTURING DUAL COSMETIC CONTAINER

TECHNICAL FIELD

The present invention relates to a method for manufacturing a dual cosmetic container. More specifically, the present invention relates to a method for manufacturing a dual cosmetic container in which a patterned portion having various shapes is formed on the outer surface of an inner preform and is expanded upon blow molding such that diverse designs can be projected through an outer container integrally coupled to the inner preform.

The present invention also relates to a method for manufacturing a dual cosmetic container in which a patterned inner container is integrally coupled to an outer container so that counterfeiting can be fundamentally prevented and customer identification marks, including a logo and initials, are carved so that the product is made unique according to each customer's request.

BACKGROUND ART

A general cosmetic container is constructed to include a body and a cap detachably coupled to the inlet of the body by screw engagement or snap-fit engagement. The body is filled with a cosmetic and the cap is detached from the body when the cosmetic content is withdrawn for use. Designs representing a trade name, a manufacturer name, and a product image are printed on the outer surface of the cosmetic container to provide the quality of the product, advertising effectiveness of the manufacturer, and the aesthetic appearance of the product.

However, the body of the cosmetic container is apt to be broken by an external impact due to user's mishandling. In recent years, Korean Patent No. 10-1288797 has proposed a cosmetic container that has a dual structure to protect the container from damage caused by external impacts.

In most of such conventional dual cosmetic containers, the inner container is formed separately from and coupled to the inner container. Thus, a space is created between the inner container and the outer container coupled to each other.

The inner surface of the outer container needs to be additionally coated, resulting in an increase in manufacturing cost. Further, this coating requires the use of several chemicals, making the manufacturing process environmentally unfriendly.

Moreover, there is a limitation in forming various patterns on the surface of the inner container. Due to this limitation, the design values of the cosmetic containers are not adequately increased, failing to stimulate consumers' purchase desire.

DISCLOSURE

Technical Problem

The present invention has been made in an effort to solve the above problems, and it is an object of the present invention to provide a method for manufacturing an improved dual cosmetic container in which various shapes of characters, patterns, pictures, etc. are formed on the outer surface of an inner container such that diverse designs can be projected through an outer container.

It is a further object of the present invention to provide a method for manufacturing a dual cosmetic container by molding an inner container and an outer container in close contact with each other, thus avoiding the need to coat the inner surface of the outer container.

It is another object of the present invention to provide a method for manufacturing a dual cosmetic container by integrally coupling a patterned inner container to an outer container so that counterfeiting can be fundamentally prevented and customer identification marks, including a logo and initials, are carved so that the product is made unique according to each customer's request.

Technical Solution

According to one aspect of the present invention, there is provided a method for manufacturing a dual cosmetic container, including: molding an inner preform 40 or 40a formed with a patterned portion having one or more shapes selected from characters, pictures, figures, and helical grooves on the outer surface thereof using an upper mold 10 for the inner preform having a molding space 11 and formed with a pattern molding portion 12a on the inner circumferential surface thereof and an lower mold 14 for the inner preform having a molding space 15 for a discharge portion; inserting the inner preform 40 or 40a into a molding space 21 of an upper mold 20 for an outer preform, fixing a discharge portion 41 of the inner preform 40 or 40a to a lower mold 23 for the outer preform, feeding a liquid raw material into the molding space 21 of the upper mold 20 for the outer preform, and molding the outer preform 50 in close contact with the outer surface of the inner preform 40 or 40a formed with the patterned portion 42; and simultaneously heating the inner preform 40 or 40a and the outer preform 50 molded in close contact with each other, inserting the two heated preforms into a molding space 31 of a blow mold 30, inserting a blow tube 32 into the discharge portion 41 of the inner preform 40 or 40a, and simultaneously expanding the inner preform 40 or 40a and the outer preform 50 by blow molding to manufacture the desired dual cosmetic container in which an inner container 100 or 100a and an outer container 200 are in close contact with each other.

Advantageous Effects

According to an exemplary embodiment of the present invention, the patterned portion having one or more shapes selected rom characters, patterns, and pictures is formed on the outer surface of the inner preform and is allowed to expand by blow molding such that the shapes are projected through the outer container coupled in close contact with the inner container to create various aesthetic effects, and as a result, the design value of the cosmetic container is increased to ensure high quality of the product and stimulate consumer's purchase desire.

In addition, according to an exemplary embodiment of the present invention, the inner container and the outer container coupled in close contact with each other are molded as if the outer container is coated on the outer surface of the inner container, avoiding the need for coating, unlike in the prior art. Therefore, the number of processing steps is decreased and the use of chemicals is eliminated, enabling the manufacture of the desired cosmetic container in an environmentally friendly manner.

Furthermore, according to an exemplary embodiment of the present invention, the pattern formed on the outer surface of the inner container is coupled in close contact with the inner surface of the outer container. This makes it impossible for an unauthorized third party to manufacture the cosmetic container through post-processing to fundamentally prevent counterfeiting. Customer identification marks, including a logo and initials, are carved so that the product is made unique according to each customer's request.

MODE FOR INVENTION

Preferred embodiments of the present invention will now be described in detail with reference to the accompanying drawings.

Figure 1:
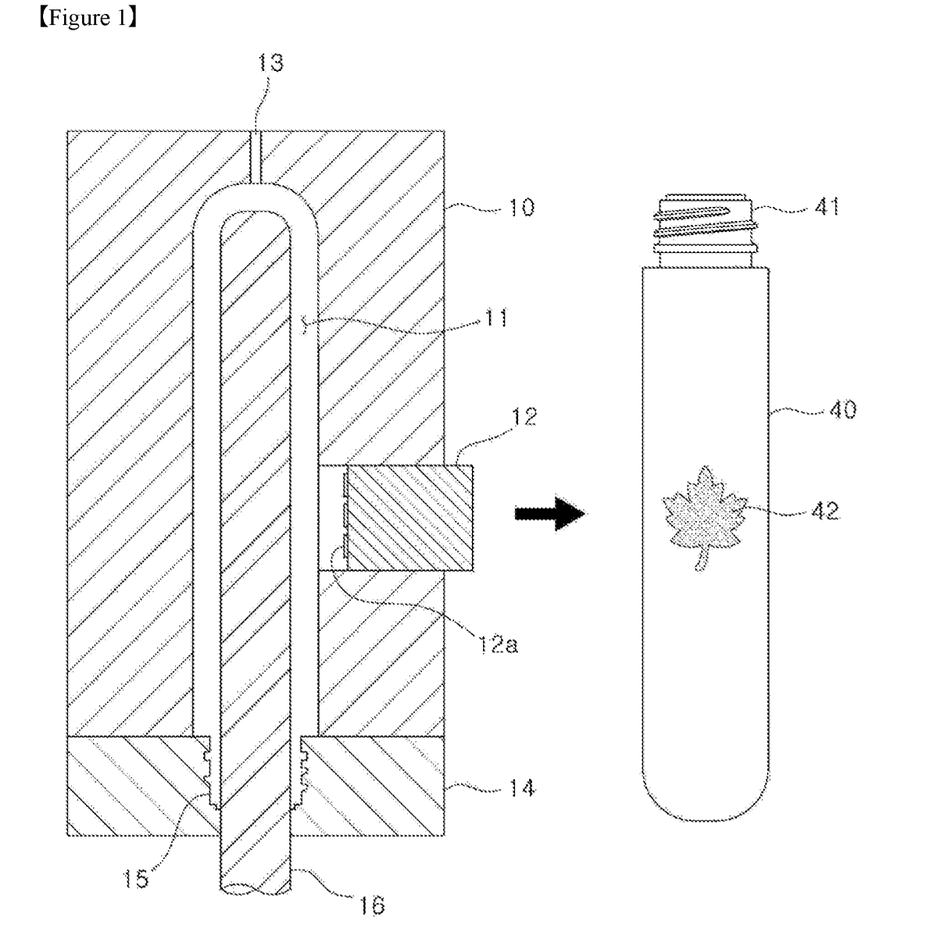
FIG. 1 is a cross-sectional view illustrating the molding of an inner preform in accordance with a method of the present invention.

A dual cosmetic container of the present invention is manufactured by the following procedure. First, an inner preform 40 formed with a patterned portion 42 having various shapes on the outer surface thereof is molded using an upper mold 10 for the inner preform and a lower mold 14 for the inner preform, as illustrated in FIG. 1.

A molding space 11 corresponding to the shape of the inner preform 40 is formed inside the upper mold 10 for the inner preform. A change core 12 formed with a pattern molding portion 12a is detachably coupled to one side of the upper mold 10 for the inner preform and the patterned portion 42 having one or more shapes selected from characters and pictures is formed by prominences and depressions on the outer surface of the inner preform 40 or 40a.

For example, the patterned portion 42 may be in various shapes such as characters, pictures, and figures. The pattern molding portion 12a for molding the patterned portion is formed by prominences and depressions on the inner circumferential surface of the change core 12. The prominences and depressions are preferably formed by corroding the surface of the mold to control the surface roughness of the mold.

The use of the change core 12 in the method of the present invention enables a free and rapid change in the pattern of the patterned portion. The change core 12 is fixed to the upper mold 10 by a general structure known in the die and mold industry, and thus a detailed description thereof is omitted.

Accordingly, the heights and widths of the prominences and depressions are appropriately adjusted such that the patterned portion 42 is enlarged while maintaining its original shape without being distorted when it is expanded by subsequent blow molding. The fine dimensional adjustments allow a consumer to easily distinguish the molded product from counterfeits. Therefore, the method of the present invention is particularly advantageous in preventing counterfeiting.

According to one embodiment of the present invention, the patterned portion 42 has predetermined shapes consisting of characters or pictures formed by the prominences and depressions and the heights and widths of the prominences and depressions are adjusted depending on the elongation of the patterned portion 42 upon blow molding such that the distortion of the patterned portion 42 is prevented upon expansion. When the patterned portion 42 is expanded by blow molding, the pattern looks smoggy.

Upon blow molding, the inner preform 40 and an outer preform 50 are expanded by 10% or less of their original heights in the height direction and by 50% or less of their original widths in the widthwise direction. Thus, the size of the patterned portion 42 needs to be controlled depending on the elongation in each direction. For example, the width of the pattern is designed to be small considering the expansions of the preforms.

Preferably, a reinforcing portion 42a with a greater depth is formed along the outer line of the patterned portion such that the overall shape of the patterned portion 42 is clearly visible upon blow molding.

According to a further embodiment of the present invention, the patterned portion 42 may be formed using an ink. Also in this embodiment, the thickness of the ink should be controlled depending on the elongation of the patterned portion upon blow molding.

An opening 13 in communication with the molding space 11 is formed at the upper side of the upper mold 10 for the inner preform. A liquid synthetic resin as a raw material is fed into the molding space 11 through the opening 13. A molding space 15 for a discharge portion is formed in the lower mold 14 for the inner preform and has a shape corresponding to the discharge portion 41 of the inner preform 40. A pin 16 is inserted into the molding space 15 and the molding space 11.

The pin 15 forms a space in the inner preform 40 and the liquid raw material entering through the opening 13 is filled in the molding spaces 11 and 15. The patterned portion 42 is molded by the pattern molding portion 12a of the change core 12 on the outer surface of the inner preform 40.

Figure 2:
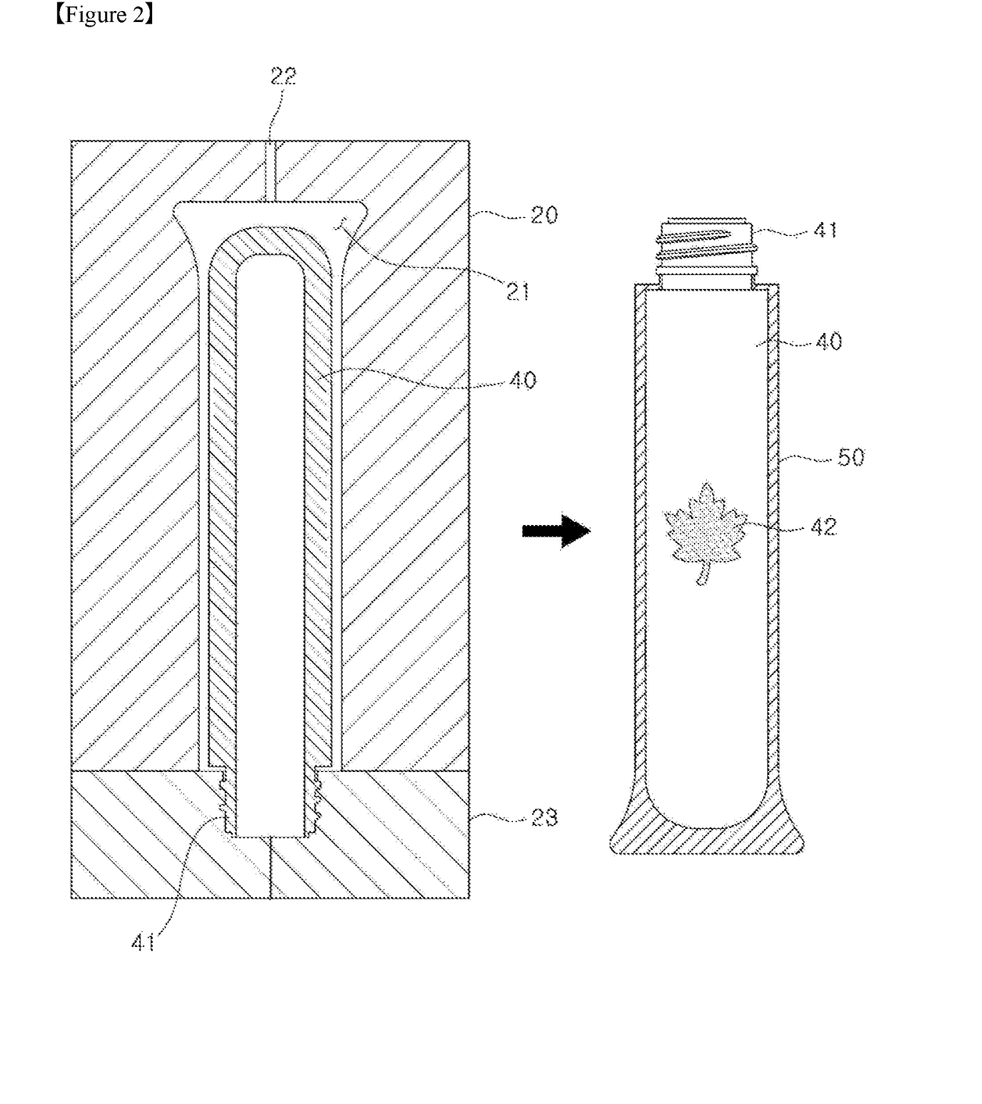
FIG. 2 is a cross-sectional view illustrating the molding of an outer preform in accordance with a method of the present invention.

The outer preform 50 is coupled in close contact with the outer surface of the inner preform 40, as illustrated in FIG. 2. For molding of the outer preform 50, the inner preform 40 is inserted into a molding space 21 of an upper mold 20 for the outer preform and the discharge portion 41 is fixed by a lower mold 23 for the outer preform.

The liquid raw material fed through the opening 22 coats the outer surface of the inner preform 40 on which the patterned portion 42 is formed, and the outer preform 50 is molded in close contact with the outer surface of the inner preform 40.

The inner preform 40 and the outer preform 50 may be made of the same or different synthetic resins. The melting point of the inner preform 40 is preferably higher than that of the outer preform 50 such that the two preforms are molded in close contact with each other upon blow molding.

Preferably, the inner preform 40 is made of a synthetic resin of various colors and the outer preform 50 is made of a transparent or translucent material such that the color of the inner preform 40 is projected outwardly through the outer preform 50.

According to one embodiment of the present invention, the inner preform 40 is made of Ecozen and the outer preform 50 is made of a PETG material. Another material for the outer preform 50 may be PE or PP that has a low melting point and good chemical resistance.

Figure 3:
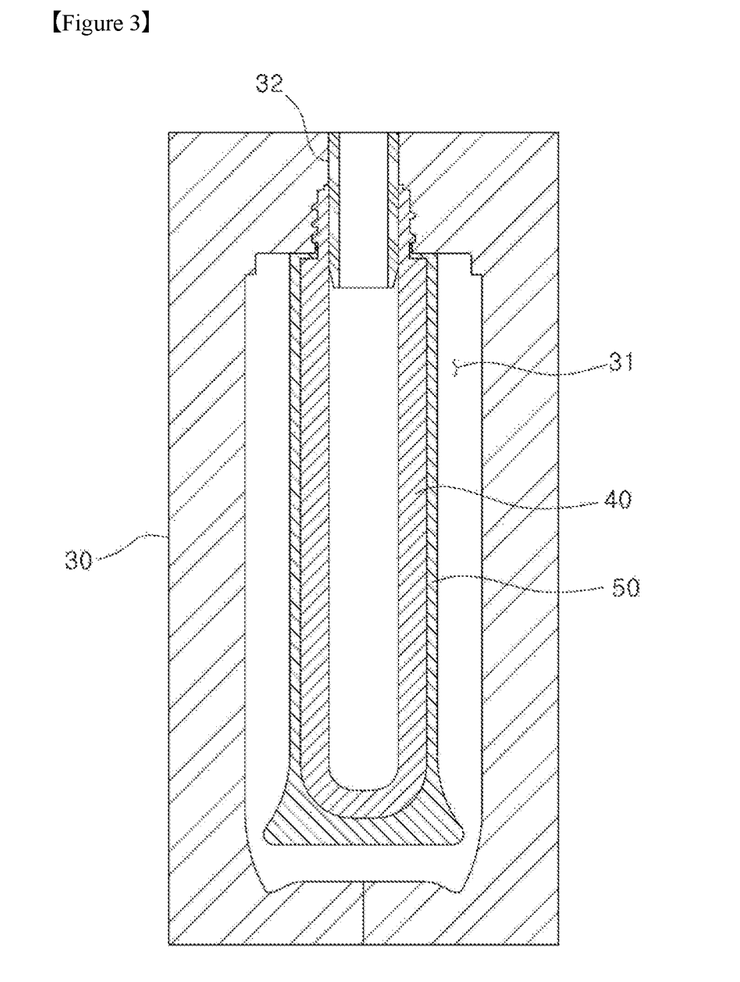
FIG. 3 is a cross-sectional view of a blow mold used in a method of the present invention.
Figure 4:
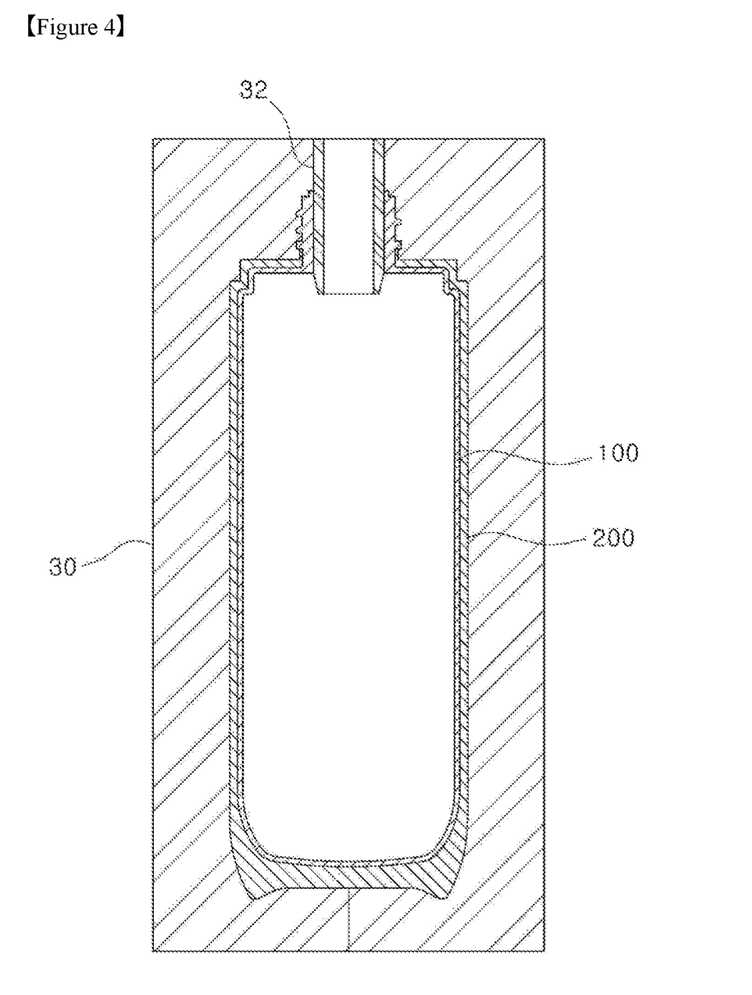
FIG. 4 is a cross-sectional view illustrating the molding of an inner container and an outer container in accordance with a method of the present invention.

The coupled preforms are inserted into a molding space 31 of a blow mold 30 consisting of left and right halves and air is fed through a blow tube 32 inserted into the discharge portion 41 such that the heated preforms expand simultaneously to form a space to be filled with a cosmetic content, as illustrated in FIG. 4. The dual cosmetic container thus manufactured has an outer shape corresponding to the molding space 31 and consists of an inner container 100 and an outer container 200.

Figure 5:
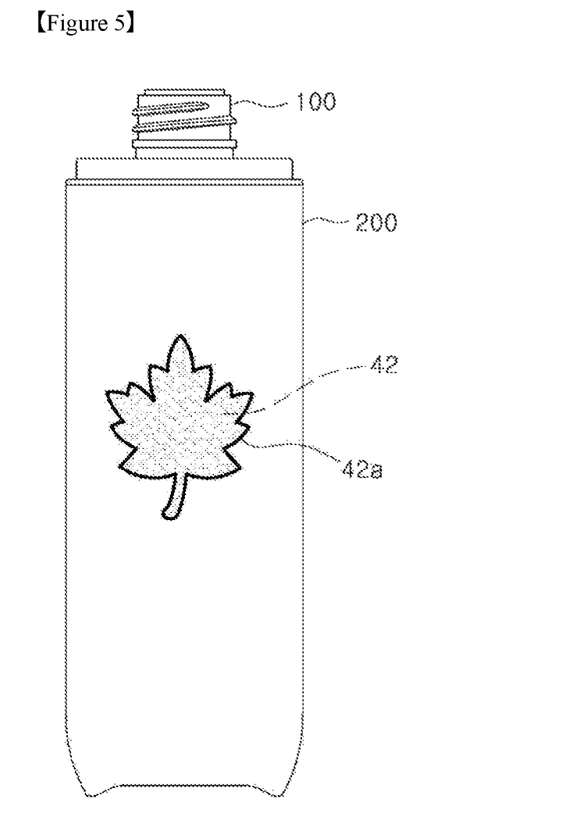
FIG. 5 is a front view of a first embodiment of a dual cosmetic container manufactured by a method of the present invention.

After this procedure is finished, the inner container 100 and the outer container 200 of the dual cosmetic container are coupled in close contact with each other, as illustrated in FIG. 5, and as a result, the patterned portion 42 having various shapes creates an image having delicate color representation through the transparent or translucent outer container 220, achieving high quality of the product. In addition, the surface corrosion of the pattern molding portion 12a allows the pattern to look like smoggy glass.

The coating of the outer container 200 on the outer surface of the inner container 100 avoids the need to coat the inner surface of the outer container, contributing to a reduction in the number of processing steps, unlike in the prior art. In addition, the use of chemicals is eliminated, enabling the manufacture of the desired cosmetic container in an environmentally friendly manner.

According to a further embodiment of the present invention, the blow mold may be a half parting mold that can be separated left and right to withdraw products after molding. In this embodiment, various shapes of products may be manufactured.

Figure 6:
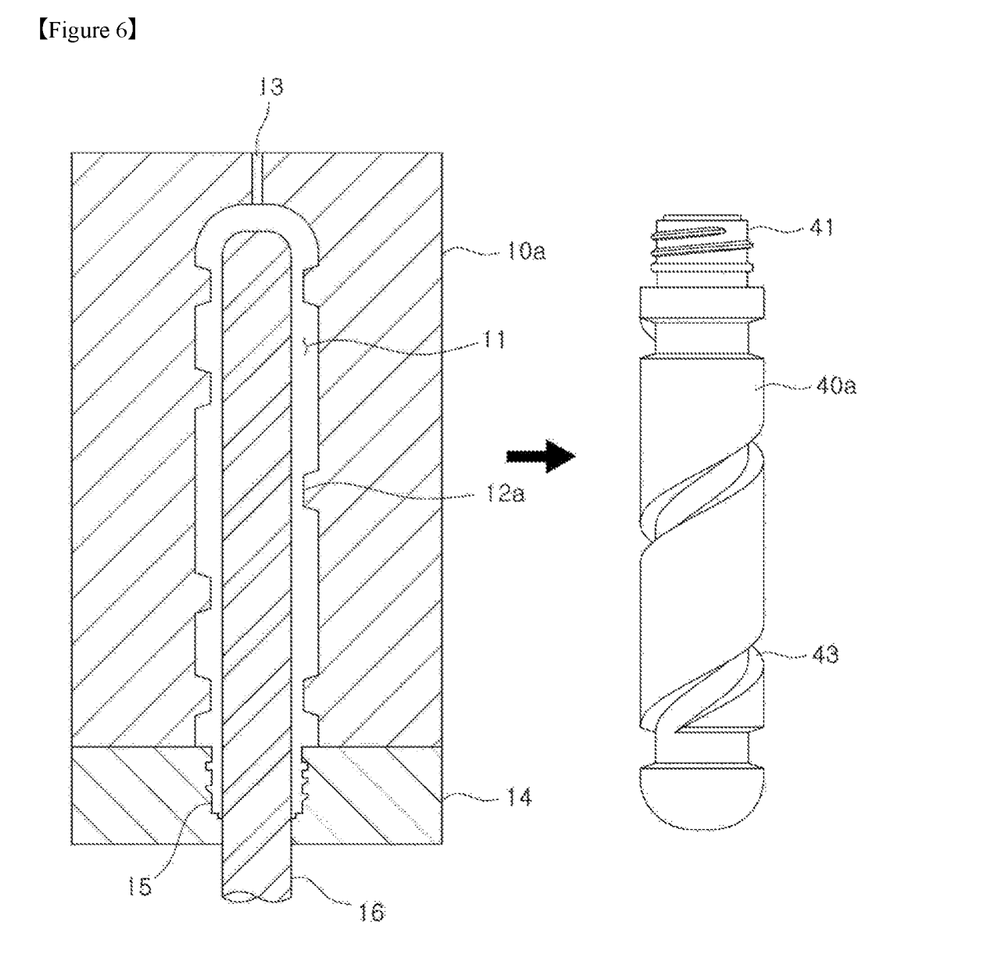
FIG. 6 is a cross-sectional view illustrating the molding of another inner preform in accordance with a method of the present invention.

That is, a helical patterned portion 43 consisting of a helical groove can be formed on the outer surface of the inner preform 40a, as illustrated in FIG. 6. Here, the pattern molding portion 12a of the upper mold 10a for the inner preform is formed corresponding to the shape of the helical patterned portion 43.

Figure 7:
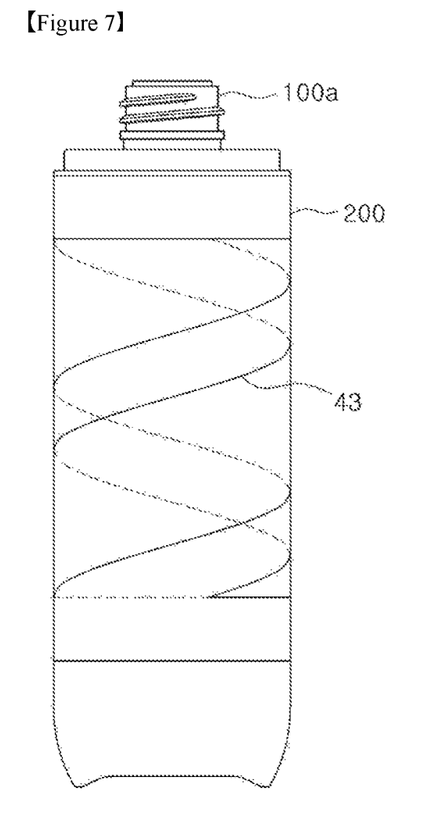
FIG. 7 is a cross-sectional view illustrating a second embodiment of a dual cosmetic container manufactured by a method of the present invention.

Subsequently, the inner preform 40 and the outer preform 50 are coupled to each other, followed by blow molding to manufacture a dual cosmetic container in which the helical patterned portion 43 of the inner container 100a is projected through the outer container 200, as illustrated in FIG. 7. The helical patterned portion 43 can be molded into various shapes depending on the depth and width of the pattern molding portion 12a.

Figure 8:
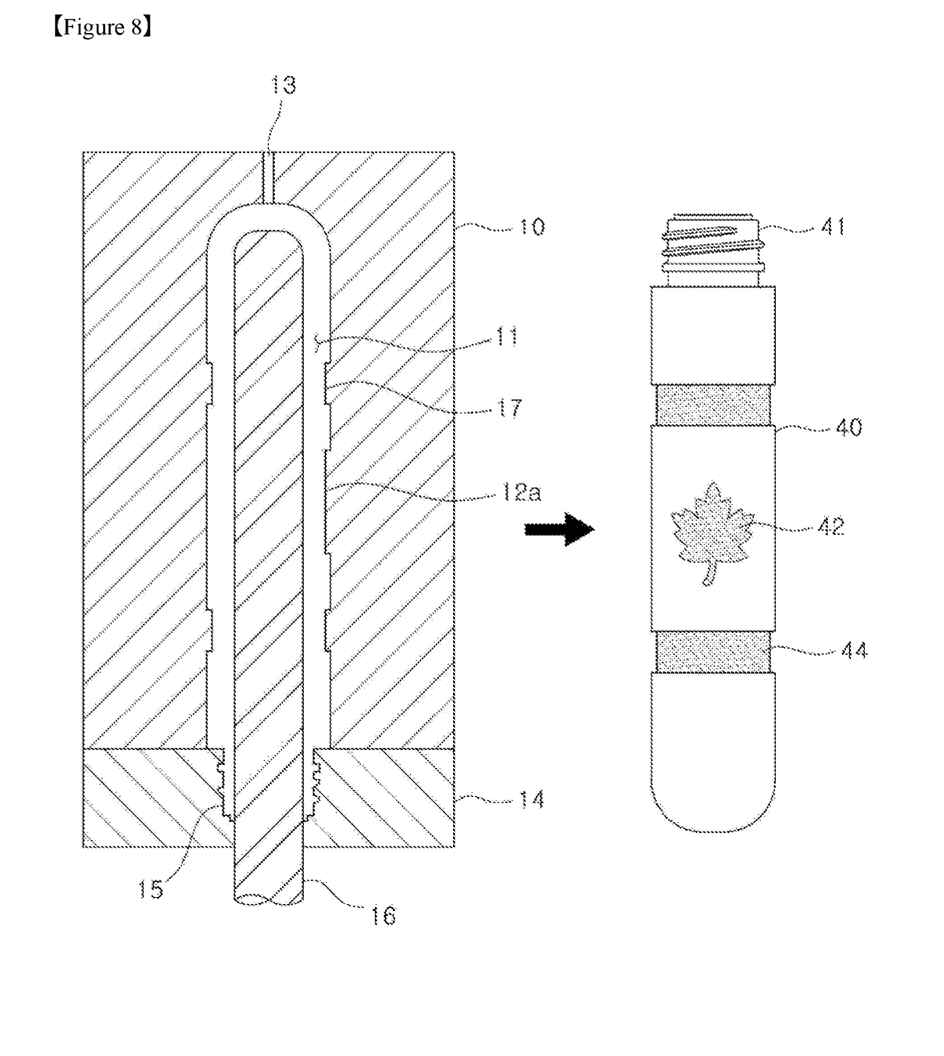
FIG. 8 is a cross-sectional view illustrating a further embodiment of the molding of an inner preform in accordance with a method of the present invention.
Figure 9:
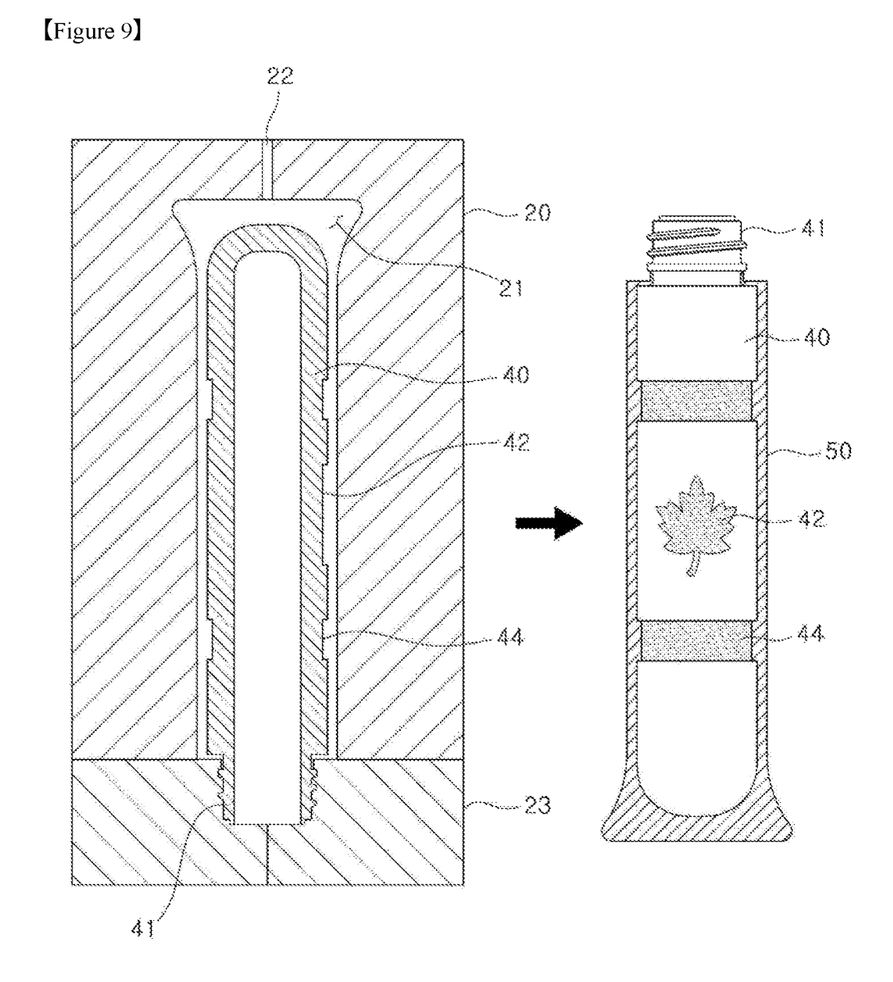
FIG. 9 is a cross-sectional view illustrating a further embodiment of the molding of an outer preform in accordance with a method of the present invention.

As illustrated in FIGS. 8 and 9, inwardly protruding expandable pattern molding portions 17 are formed above and below the coupled the change core 12 on the inner surface of the upper mold 10 for the inner preform and expansion compensation portions 44 may be formed above and below the patterned portion 42 of the inner container 100a to prevent the patterned portion from being distorted upon expansion.

Therefore, the patterned portion 42 having one or more shapes selected from characters, patterns, and pictures is formed on the outer surface of the inner preform 40 or 40a, expanded by blow molding, and projected through the outer container 200 coupled in close contact with the inner container 100 or 100a to create various aesthetic effects, and as a result, the design value of the cosmetic container is increased to ensure high quality of the product and stimulate consumer's purchase desire.

In addition, since the inner container 100 or 100a is coupled to the outer container 200 in close contact with each other, the outer surface of the inner container 100 or 100a is coated with the outer container 200 to avoid the need to coat the inner surface of the outer container, contributing to a reduction in the number of processing steps, unlike in the prior art. Furthermore, the use of chemicals is eliminated, enabling the manufacture of the desired cosmetic container in an environmentally friendly manner.

The invention claimed is:

1. A method for manufacturing a dual cosmetic container, comprising:
    molding an inner preform (40 or 40a) formed with a patterned portion having one or more shapes selected from characters, pictures, figures, and helical grooves on an outer surface thereof using an upper mold (10) for the inner preform having a molding space (11) and formed with a pattern molding portion (12a) on an inner circumferential surface thereof and an lower mold (14) for the inner preform having a molding space (15) for a discharge portion;
    inserting the inner preform (40 or 40a) into a molding space (21) of an upper mold (20) for an outer preform, fixing a discharge portion (41) of the inner preform (40 or 40a) to a lower mold (23) for the outer preform, feeding a liquid raw material into the molding space (21) of the upper mold (20) for the outer preform, and molding the outer preform (50) in close contact with the outer surface of the inner preform (40 or 40a) formed with the patterned portion (42); and
    simultaneously heating the inner preform (40 or 40a) and the outer preform (50) molded in close contact with each other, inserting the two heated preforms into a molding space (31) of a blow mold (30), inserting a blow tube (32) into the discharge portion (41) of the inner preform (40 or 40a), and simultaneously expanding the inner preform (40 or 40a) and the outer preform (50) by blow molding to manufacture the desired dual cosmetic container in which an inner container (100 or 100a) and an outer container (200) are in close contact with each other,
    wherein a reinforcing portion (42a) with a greater depth is formed along an outer line of the patterned portion such that an overall shape of the patterned portion (42) is clearly visible upon blow molding.

2. The method according to claim 1, wherein the pattern molding portion (12a) comprises prominences and depressions forming a pattern, and heights and widths of the prominences and depressions are adjusted depending on an elongation of the patterned portion (42) upon blow molding such that a distortion of the patterned portion (42) is prevented upon expansion.

3. The method according to claim 1, wherein the inner preform (40 or 40a) is made of a colored synthetic resin, the outer preform (50) is made of a transparent or translucent material, and a melting point of the inner preform (40 or 40a) is higher than or equal to a melting point of the outer preform (50) such that the outer preform (50) is molded in close contact with the outer surface of the inner preform (40 or 40a).

4. The method according to claim 1, wherein a change core (12) formed with the pattern molding portion (12a) is detachably coupled to one side of the upper mold (10) for the inner preform.

5. The method according to claim 1, wherein inwardly protruding expandable pattern molding portions (17) are formed in upper and lower portions of the inner surface of the upper mold (10) for the inner preform and expansion compensation portions (44) are formed above and below the patterned portion (42) of the inner container (100*a*) to prevent the patterned portion from being distorted upon expansion.

* * * * *